United States Patent [19]

Gansbuehler et al.

[11] Patent Number: 5,137,591
[45] Date of Patent: Aug. 11, 1992

[54] CONDUCTIVE POLYMERIC HEATER

[75] Inventors: George M. J. Gansbuehler; George B. Park, both of Swindon, England; Per Jan T. Jensen, Slangerup, Denmark

[73] Assignee: Raychem Ltd., London, England

[21] Appl. No.: 582,806

[22] Filed: Sep. 13, 1990

Related U.S. Application Data

[63] Continuation of Ser. No. 241,643, Sep. 8, 1988, abandoned.

[51] Int. Cl.$^5$ .......................... B29C 65/34; H05B 3/38
[52] U.S. Cl. ........................................ 156/86; 156/94; 156/158; 156/273.9; 156/304.2; 156/304.3; 156/304.6; 156/379.7; 219/535; 219/541
[58] Field of Search ................. 156/86, 94, 158, 272.4, 156/273.9, 304.2, 304.3, 304.6, 379.7; 219/535, 541, 544, 550

[56] References Cited

U.S. PATENT DOCUMENTS

| | | | |
|---|---|---|---|
| 2,786,264 | 3/1957 | Colombo | 219/535 |
| 3,235,289 | 2/1966 | Jones | 156/304.6 |
| 3,649,438 | 3/1972 | Walker et al. | 156/273.9 |
| 3,829,657 | 8/1974 | Hinz | 219/535 |
| 4,096,017 | 6/1978 | Wyke et al. | 156/273.9 |
| 4,591,701 | 5/1986 | Tokumaru | 219/541 |
| 4,675,512 | 6/1987 | Doucet et al. | 219/535 |
| 4,775,501 | 10/1988 | Rosenzweig et al. | 156/86 |

Primary Examiner—Michael G. Wityshyn
Attorney, Agent, or Firm—Timothy H. P. Richardson; Herbert G. Burkard

[57] ABSTRACT

A method and article for joining two substrates or repairing a substrate comprising positioning in thermal contact with and surrounding the substrate(s) a tubular article comprising conductive polymeric material. Two electrodes extending along the whole or part of the article as connected to a source of electrical power to cause current to pass through and heat the article. The conductive polymeric material is urged radially inwards towards the substrate(s). The radially inward movement may be caused by recovery of the conductive polymeric material, or by the use of elastomeric material.

27 Claims, 2 Drawing Sheets

CONDUCTIVE POLYMERIC HEATER

This application is a continuation of Ser. No. 07/241,643, filed Sep. 8, 1988, now abandoned.

DESCRIPTION

This invention relates to a method and heater for joining two elongate substrates or repairing an elongate substrate. The heater comprises conductive polymeric material which is heated by the passage of electrical current therethrough.

Conductive polymeric materials and devices incorporating them are also well known. Reference may be made for example to U.S. Pat. Nos. 2,952,761, 2,978,665, 3,243,753, 3,351,882, 3,571,777, 3,658,976, 3,757,086, 3,793,716, 3,823,217, 3,858,144, 3,861,029, 3,950,604, 4,017,715, 4,072,848, 4,085,286, 4,117,312, 4,151,126, 4,177,376, 4,177,446, 4,188,276, 4,237,441, 4,242,573, 4,246,468, 4,250,400, 4,252,692, 4,255,698, 4,271,350, 4,272,471, 4,304,987, 4,309,596, 4,309,597, 4,314,230, 4,314,231, 4,315,237, 4,317,027, 4,318,881, 4,327,351, 4,330,704, 4,334,351, 4,352,083, 4,361,799, 4,388,607, 4,398,084, 4,413,301, 4,425,397, 4,426,339, 4,426,633, 4,427,877, 4,435,639, 4,429,216, 4,442,139, 4,459,473, 4,470,898, 4,481,498, 4,476,450, 4,502,929; 4,514,620, 4,517,449, 4,534,889, and 4,560,498; J. Applied Polymer Science 19, 813–815 (1975), Klason and Kubat; Polymer Engineering and Science 18, 649–653 (1978), Narkis et al; European Application Nos. 38,713, 38,714, 38,718, 74,281, 92,406, 119,807, 133,748, 134,145, 144,187, 157,640, 158,410, 175,550 and 176,284; and Japanese Published Patent Application No. 59-122,524.

A tubular article which comprises conductive polymeric material is known from European Patent Application Publication No. 0157650. This tubular article is electroded by circumferential electrodes on either end of the coupler so that current flows along the length of the coupler. The heater is heat recoverable to a small extent and can be used to join or repair pipelines.

Another recoverable article which comprises conductive polymeric material is disclosed in GB 1562086. This uses a plurality of fabric electrodes to follow the recovery of the article.

A heat recoverable article is an article the dimensional configuration of which may be made substantially to change when subjected to heat treatment. Usually these articles recover, on heating, towards an original shape from which they have previously been deformed, but the term "heat-recoverable", as used herein, also includes an article which, on heating, adopts a new configuration, even if it has not been previously deformed.

It is also known to be desirable to use for a conductive recoverable article, a material which exhibits a PTC (positive temperature coefficient of resistivity) effect, that is a sharp rise in resistivity at a particular, or over a short range of temperatures. The temperature or temperature range is known as the anomaly or switching temperature. Typically the material is selected to exhibit the sharp rise in temperature at or slightly above the recovery temperature of the article. The PTC effect minimises overheating and consequent so-called "thermal runaway" of the material. Materials which exhibit a PTC effect are typically referred to simply as PTC materials.

Reference may also be made, for example, to U.S. Pat. Nos. 4,534,889, 4,560,498, 4,545,926 and 4,775,501 which all describe conductive polymers, that is, an organic polymer, or blend of organic polymers, having dispersed or otherwise distributed therein conductive particles, for example carbon black. The term "organic polymer" means any polymer which contains carbon in the backbone and/or the side chains, including, for example, polymers of olefinic monomers, polyamides, polyesters, polyacrylates, polyimides, polycarbonates and polysiloxanes.

We have discovered a new method and article for joining or repairing elongate substrates using conductive polymeric material. The method uses a tubular article electroded along its length. The article may be of open (wraparound) or closed cross-section. The tubular article may be open at one or both ends. As used herein the term "wraparound" means a cover which can be positioned around a substrate, and longitudinal edges secured together to form a tubular article around the substrate. The term does not include spirally wrapped tapes. Where the article is wraparound it may comprise a simple flexible sheet. Alternatively it may be a multi-part piece, for example two half shells. The article may be flexible allowing easy installation of the article. It is preferably also readily recoverable and removable.

Figure 1:
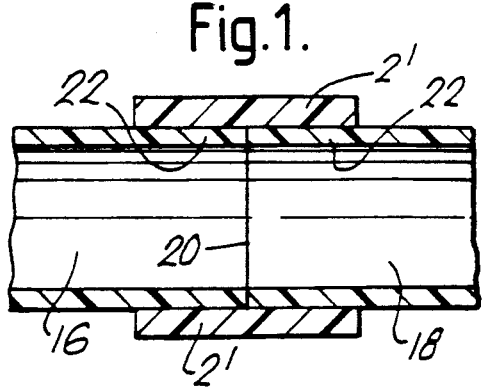
FIG. 1 shows an article of the invention recovered over a joint between two polymeric pipes.

A first aspect of the invention provides a method of joining two elongate substrates, or of repairing a damaged substrate comprising:
(a) positioning in thermal contact with, and surrounding the substrate(s), a tubular article comprising conductive polymeric material, having extending along the whole or part of its length at least two electrical connection means;
(b) connecting the electrical connection means to a source of electrical power to cause a substantial portion of the electrical current to flow between the electrical connection means substantially parallel to the faces of the article thereby heating the conductive polymeric material; and
(c) urging the conductive polymeric article radially inwardly towards the substrates.

The radially inward movement may be caused by recovery of the conductive polymeric material, or by the use of an elastomeric material.

As used herein the term "electrical connection means" may mean actual electrodes, or may mean part of the article to which electrodes can conveniently be attached.

Where the article for joining or repairing elongate substrates is heat recoverable, it is preferably recovered into thermal contact with the substrate to be heated. By "recovery into thermal contact" we mean at least part of the heater is in thermal contact with the substrate after recovery. The recovery step may be carried out electrically, for example by connecting the electrodes to an electrical power source to cause current to flow through the article and heat it. Alternatively the article may be recovered by non-electrical means, e.g. a heat gun. Where the article is recovered electrically the same or different power source at the same or different voltage and/or current may be used to recover the article and then heat the substrate.

In one embodiment according to the invention the joining or repair is effected by introducing a heat softenable material between the conductive polymeric material and the substrate. This heat softenable material flows on heating of the conductive polymeric material. Thus where two substrate are to be joined it may flow and bond the substrates to each other, or it may flow to bond one or both substrates to the heater itself. Where a substrate is damaged and to be repaired, the heat softenable material may flow to cover and/or fill the damaged area. The softenable material may be polymeric. It may also be an adhesive.

Where a heat softenable material is used this may be provided in any suitable form. It may be provided as a discrete piece, or as a lining partially or totally covering the inner surface of the article. For a repair operation, it can conveniently be provided as a discrete patch positioned over the damaged area.

Where a heat softenable material is used, the article itself may be removed after flowing of the heat softenable material. To facilitate this a release member is preferably provided between the heat softenable material and the conductive polymeric material.

In another embodiment, the article is used to join two abutting, or telescoped, preferably polymeric substrates. The substrates preferably comprise compositions that are compatible with each other or with the material of the heater so that the substrates are mutually fusible, or fusible with the heater, one composition wetting the other composition to cause the fusion.

Where an article is used to join two abutting or telescoped substrates, an insert member is preferably used to prevent collapse of the inner substrates.

The term "fusion", is used herein to mean that sufficient molecular compatibility exists between the fusible components to be joined that a bond forms which will provide mechanical performance equal to or greater than that of the substrate. This may be through viscoelastic contact as defined by J. N. Anand in Adhesion 1, 1969, pages 16 through 23 and Adhesion 2, 1970, pages 16 through 22, or through a process of molecular diffusion across the polymer/polymer interface, such that, within the interfacial region there is a continuous concentration gradient of one polymer into the other.

Those skilled in the art will have no difficulty in determining whether two compositions are compatible. Guidelines to the compatibility of polymers are disclosed in U.S. Pat. No. 4,775,501, the entire disclosure of which is incorporated herein by reference.

Where the substrates are mutually fusible the heater is preferably arranged to heat the pipes to a temperature sufficient to cause fusion therebetween. After fusion, the heater may be left in place. This may provide mechanical reinforcement or environmental protection. Alternatively the heater may be removed. Where the heater material is itself compatible with the material of the substrates it may fuse to the substrates on heating, and therefore cannot easily be removed.

The tubular article according to the invention may be used, for example to join or repair pipes or cables or other elongate substrates. It may also be used to join a pipe-like structure to a cable. For example it may be used to join a cable passing through a bulkhead to a spigot pipe extending from the bulkhead.

The article used in the method according to the invention is preferably wraparound, and the method preferably comprises positioning a closure on the heater to form the wraparound into a tube of closed cross-section.

A wraparound article per se is also believed to be patentable according to the invention.

A second aspect of the invention provides a wraparound tubular article, and a closure means for closing the wraparound, comprising a conductive polymeric material having extending along the whole or part of its length at least two electrical connection means, preferably electrodes which can be connected to a source of electrical power to cause a substantial portion of the electrical current to flow between the electrical connection means substantially parallel to the faces of the article, thereby heating the conductive polymeric material.

In one embodiment when the article is wraparound it comprises two or more parts joined by two or more closures. All the parts or only some of the parts may be electrically conductive. Similarly all the parts or only some of the parts may be heat recoverable. Also some of the parts may be elastomeric. All the parts may be the same or different sizes. A number of examples are now given.

One embodiment uses two half shells joined by two closures. Both half shells are heat recoverable and comprise electrically heatable conductive polymeric material.

Another embodiment comprises two half shells joined by two closures. One half shell is heat recoverable and comprises electrically heatable conductive polymeric material. The other half shell may be heat stable, or electrically non-conductive, or both.

Another embodiment comprises two half shells joined by two closures. One half shell is heat-stable and comprises electrically conductive polymeric material. The other half shell comprises an elastomer.

Where closures are used in a wraparound article, electrical powering may be through the closure. Where there are two closures, powering may be through both. Where there is only one closure, powering may be through the closure and another electrode embedded in or on the surface of the heater. The electrical connection means are preferably positioned so that, when the electrodes are supported thereon, and powered, electrical power flows around predominantly the circumference of the tubular article in at least two discrete current paths.

According to the invention a radially inwardly directed force is applied to urge the conductive polymer into contact with the substrate. This is required to form the joint or repair of the substrates. The force may be applied for example by use of a heat recoverable material as the conductive material, or by the use of an elastomer.

In articles according to the invention, the wall thickness of the article may be varied along its length. Also two or more layers of different materials may be used. The second or additional layer may extend along the whole or along only part of the length of the article. They may have electrical properties e.g. room temperature resistivity and resistivity/temperature behaviour, that is the same as, or different to, that of the first material. As an example, the second or subsequent layers may comprise a material that exhibits traditional PTC behaviour. The effect of the additional layer(s) is that it (they) provide additional material through which electrical current can flow, and hence provide additional heating. By appropriate choice of the resistivity of the material of the additional layer(s) greater heating can be achieved than would be the case were a similar additional thickness of the first material used. This may be advantageous, for example to decrease recovery times in certain regions, or where a higher temperature is required. Therefore in some preferred embodiments second or subsequent layers of material different ot the first material are added in selected regions.

Similarly the thermal load of various sections of the article can be varied, for example by adjusting the thickness of the adhesive or sealant on the sections of the article. The sections with the thickest adhesive will take the longest to heat, and hence the amount of heating of the sections is varied.

Another example of using two layers of different materials is where certain properties, e.g. flame retardancy, solvent resistance, abrasion resistance, electrical insulation, impact resistance, colour coding are required.

Where two or more layers are used these may be applied separately, for example by sequential extrusion or may be co-extruded.

Any suitable materials can be used for the conductive polymeric material. Preferably the material is flexible to allow easy installation, and where appropriate, removal of the heater. By flexible is meant the material can be bent by hand around a four inch mandrel, preferably a one inch mandrel by hand.

For certain embodiments the article preferably comprises a material that has a pseudo PTC effect, with a pseudo PTC ratio (ratio of peak resistivity to resistivity at 25° C.) in the range 1½ to 10. Examples of suitable materials described in U.S. patent application No. 07/242,081, now abandoned, and in U.S. patent application Ser. No. 07/241,660, the entire disclosures of which are incorporated herein by reference. A definition of pseudo PTC ratio is also given in these specifications. One example of a suitable material that can be used is 59.7 parts by weight Elvax 770 (an EVA of 9.5 parts by weight by weight vinyl acetate content and a melt flow index of 0.8 as supplied by Du Pont), 39.8 parts by weight by weight of Vulcan P (a carbon black supplied by Cabot Corporation) and 0.5% by weight antioxidant.

Other suitable examples are:

| Polymer (parts by weight) | Carbon black (parts by weight) | Antioxidant (parts by weight) |
| --- | --- | --- |
| Marlex* HXM50100 (59.4) | Vulcan* P (39.6) | (1.0) |
| Elvax* 460 (59.4) | Sevalco* N110 (39.6) | (1.0) |
| Sclair* 11D-1 (59.4) | Ensaco* MS (39.6) | (1.0) |
| Elvax* 460 (59.4) | Vulcan* P (39.6) | (1.0) |

*represents a trademark

The polymeric material used are as follows:
Marlex HXM 50100 is a HDPE supplied by Phillips.
Elvax 460 is an EVA supplied by Du Pont.
Sclair 11D-1 is a LLDPE suppled by Du Pont, Canada.
Vulcan P, Ensaco MS and Sevalco N110 are supplied by Cabot Corporation, Ensagri Willebroek NV and Sevalco Ltd. respectively.

The preferred pseudo PTC effect (which is lower than for standard PTC materials) acts to minimise overheating of any particular region.

The article preferably has the electrical characteristics of the articles described in U.S. patent application Ser. No. 07/242,081 filed contemporaneously herewith, the disclosure of which is incorporated herein by reference. Articles according to that invention are laminar, are at least partly expanded from X% to Y% to make them heat recoverable and comprise a conductive polymeric material the resistivity of which decreases on expansion as measured in the direction of current flow, in at least part of the expansion range. Other articles according to that invention are heat recoverable, comprise a conductive polymeric material which has a resistivity which increases on recovery as measured in the direction of current flow, throughout the temperature range 20° C. to Te (extrapolated end temperature as measured according to ASTM D3418-82).

Other articles according to that invention have a so called pseudo PTC ratio (peak resistivity : resistivity at 25° C.) in the range 1½ to 10, and are connected to electrodes so that current flows parallel to the faces of the article. Preferably the articles are expanded to render them recoverable and the composition of the articles decreases when expanded by 25% by more.

The pseudo PTC effect, in the same way as a traditional PTC effect, means that if one region becomes hotter its resistivity will increase and "switch-off", current being directed to adjacent regions. Because of the electrode configuration, current flows around the entire circumference of the heater. This means that if one circumferential region temporarily "switches-off" electrical current and heat to adjacent regions is advantageously maintained.

Another advantage of the electrode configuration is that long length heaters can be made.

In preferred embodiments of the invention, the electrodes come closer together on recovery. This lowers the resistance path between them. The resistivity of the material however simultaneously increases in the preferred case in which the material has a resistivity which reversibly decreases on expansion. This resistivity increase helps to compensate for the resistance path decrease. This feature also tends to shunt current away from any area recovered first or most. It can also be used to influence which areas current is initially directed to. This is also described in U.S. application Ser. No. 7/242,081, the disclosure of which is incorporated herein by reference., A substantial portion of the electrical current flows substantially parallel to the faces of the article, especially above the anomaly temperature of the composition. Preferably the electrical current flows in a direct path between the electrodes.

According to the invention, particularly when the preferred materials described in U.S. patent application Ser. No. 07/242,081 are used, it is possible to achieve recovery ratios of at least 2:1, 3:1 or even 4:1. This means small inventory is needed. It also enables substrates of different diameters to be joined or substrates of non uniform diameter to be repaired.

Where the electrical connection means are electrodes that extend along the length of the article, these may be on the surface of, or embedded in walls of the article.

Alternatively they may be on the surface of or embedded in conductive polymeric, preferably heat stable, flanges extending along the length of the article. These flanges may project outwardly from or inwardly into the article, or both. These arrangements are described in U.S. patent application Ser. No. 07/241,749, now U.S. Pat. No. 4,990,380, the entire disclosure of which is incorporated herein by reference.

FIG. 1 shows an article 2' recovered over a joint between two polymeric pipes 16 and 18. The pipes comprise mutually fusible material (superscript indicates recovered part). When current is passed through the article 2' the pipes 16 and 18 heat and flow and fuse at their abutting surfaces 20. After fusion the article 2' can optionally be removed. It may provide reinforcement if retained.

In an alternative embodiment which may also be represented by FIG. 1, pipes 16 and 18 are mutually fusible with the material of article 2', but not necessarily with each other. In this case the heat causes the article 2' to fuse to each pipe 16, 18 around the outer surface of each pipe 16,18 at the interface 22.

Figure 2:
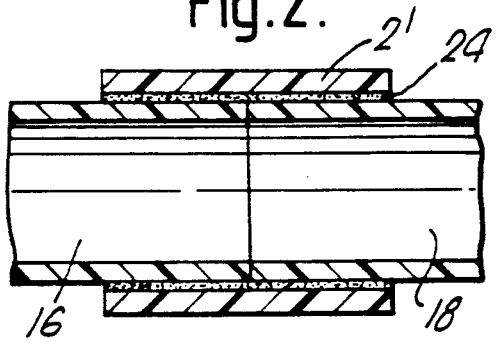
FIG. 2 shows an article of the invention recovered over a pipe whereby an adhesive liner has been caused to melt and flow to seal a hole in the pipe.

FIG. 2 shows another embodiment in which an electrically recovered and heating article 2' has caused an adhesive liner 24 on the heater to flow to seal the heater 2' to the pipes 16 and 18, thereby joining them.

Figure 3:
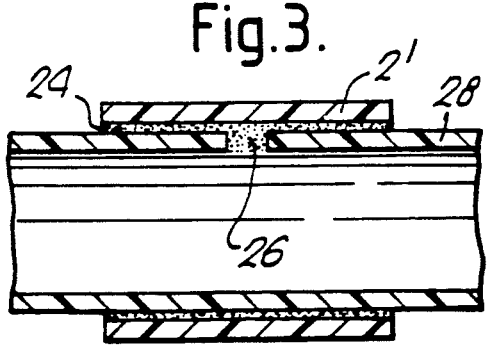
FIG. 3 shows an article of the invention electrically heated to cause recovery over a pipe whereby an adhesive liner has been caused to melt and flow to seal a hole in the pipe.

FIG. 3 shows another embodiment in which an electrically recovered and heating article 2' has caused an adhesive lining 24 to melt and flow to seal a hole 26 in damaged pipe 28.

Figure 4:
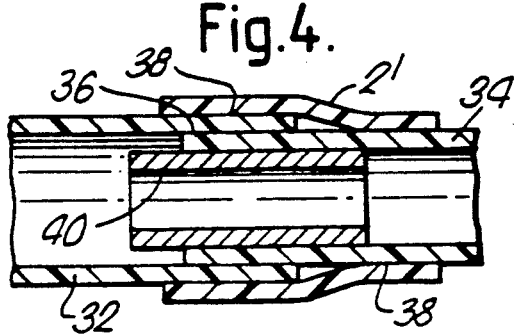
FIG. 4 shows an article of the invention recovered over a joint between two polymeric pipes, one of which is telescoped inside of the other.

FIG. 4 shows a heater 2' recovered over a joint between two polymeric pipes 32 and 34. Pipes 32 and 34 have different diameters. They are telescoped together so that an end section of pipe 34 sits inside pipe 32, of larger diameter. The pipes 32, 34 comprise mutually fusible material. When current is passed through the article 2', the pipes 32 and 34 heat and flow and fuse at their overlapped surface 36. An insert 40 is used to prevent collapse of the inner pipe 34.

In an alternative arrangement which may also be represented by FIG. 4, pipes 32 and 34 are mutually fusible with the material of article 2'. In this case heat causes the article 2' to fuse to each of pipes 32 and 34 along interface surfaces 38.

Figure 5:
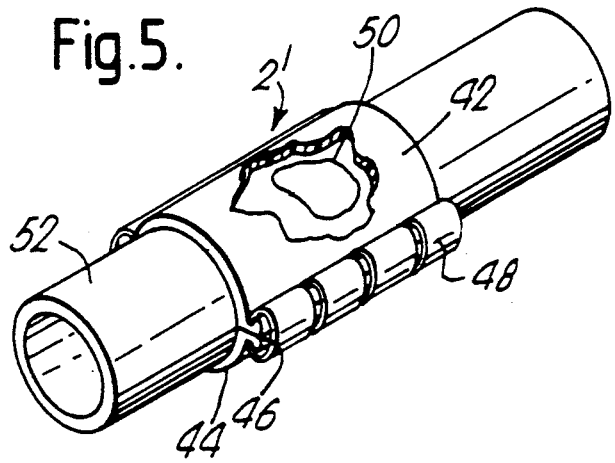
FIG. 5 shows a recovered article of the invention comprising 2 half shells of electrically conductive heat recoverable conductive polymer.

FIG. 5 shows a recovered article 2 which comprises two half shells 42 and 44 of electrically conductive heat recoverable conductive polymeric material. The half shells include upstanding rails 46 at their longitudinally opposed edges, which are joined by channel closures 48. Under the article 2 is a discrete patch 50 of heat softenable material. This is caused to flow on heating of the conductive polymer article 2 by passage of electrical current. The flowed patch repairs a damaged area in the polyethylene cable jacket of substrate 52. The patch of heat softenable material may be selected of appropriate size depending on the size of the repair to be made. Where it is desired to remove the heater after repair, a release paper (not shown) may be included between article 2' and the heat softenable material 50. The electrical current is supplied to the conductive polymeric material of article 2 via the channels (which are metal) 48. To enhance conduction to the conductive polymeric material the outer surfaces of the rails are painted with silver paint strips (not shown in FIG. 5).

Figure 6A:
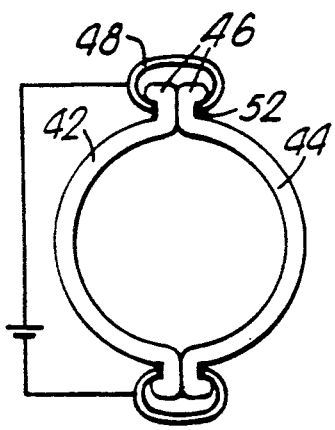
FIG. 6a to 6c show a number of arrangements for electroding wraparound heaters.
Figure 6B:
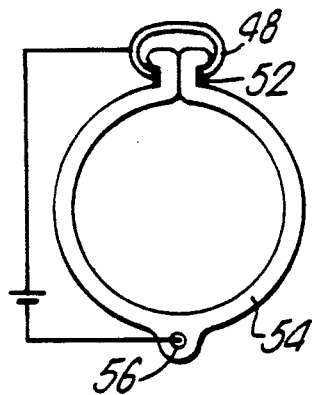
Figure 6C:
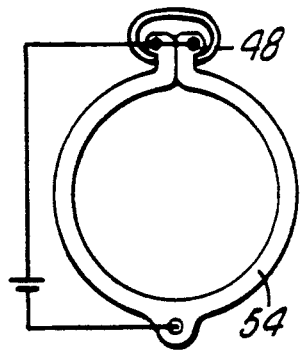

FIG. 6a to 6c show a number of arrangements for electroding wraparound heaters. The embodiment (a) is the same as FIG. 5. Two half shells 42,44 are joined by closure 48 through which they are powered. The silver paint contacts are referenced as 52. In the embodiment (b) there is only a single wraparound part 54 closed by a channel 48. One electrode is provided by channel 48 and silver paint 52. Another electrode 56 is embedded in the wraparound part on the opposite side of the tubular part. In FIG. 6c, there is only a single wraparound part joined by a closure 48. Both electrodes are embedded in the conductive polymeric material on opposite sides of the tubular part.

In the embodiment shown in FIG. 5 and 6a, both the half shells 42 and 44 comprise heat recoverable electrically conductive polymeric material. In another embodiment only one half shell may be heat recoverable and/or electrically conductive. This means that only one side will recover and/or heat. However this may be sufficient to cause the required urging force and heating for certain applications. In yet another embodiment one half shell may be elastomeric and the other half shell electrically conductive (optionally heat recoverable). In this case the elastomeric half shell can cause the urging force and the electrically conductive half shell can cause the heat required. Other variations in which one or both half shells are heat recoverable and/or electrically conductive and/or elastomeric are also envisaged. Also the two half shells may be replaced by more than two parts, i.e. multiple segments may be used. In all cases the segments may be the same or different sizes.

Typical dimensions for an article according to the invention are as follows:

Extruded (prior to expansion thickness 4 mm).
Expanded thickness 1 mm.
Length 2.5 cm to several meters. Typically 5 cm to 1 meter for joining cables or pipes.
Internal recovered diameter typically 1 cm. For some applications, typically up to 50 cm.

The disclosures of the following United States Applications filed contemporaneously herewith are also included herein by reference: Ser. Nos. 07/241,749, 07/242,089, 07/242,081, 07/242,089, 07/241,658, now U.S. Pat. No. 5,013,894, and 07/241,660.

We claim:

1. A method of modifying an elongate substrate, which method comprises
   (1) positioning in thermal contact with, and surrounding, an elongate substrate, a tubular article comprising
      (i) a laminar conductive polymer element which extends circumferentially around at least a part of the tubular article and
      (ii) at least two electrodes which extend along at least a part of the axial dimension of said element and which are circumferentially spaced apart from each other; and
   (2) connecting the electrodes to a source of electrical power to cause electrical current to flow through and heat the conductive polymer element between the electrodes, a substantial proportion of the current flowing substantially parallel to the faces of the conductive polymer element along at least two discrete current paths which are circumferentially spaced from each other, while urging the article radially inwards towards the substrate.

2. A method according to claim 1, wherein there is placed, between the conductive polymer element and the substrate, a heat softenable material which flows on heating of the conductive polymer element.

3. A method according to claim 2, wherein the heat softenable material is provided as a discrete piece 4. A method according to claim 2, wherein the heat softenable material is provided as a lining on the inside of the element.

5. A method according to claim 2, wherein a release member is provided between the heat softenable material and the article, and the article is removed after flowing of the softenable material.

6. A method according to claim 2 wherein the substrate is damaged and the heat softenable material flows to repair the damaged substrate.

7. A method according to claim 2 wherein there are two elongate substrates and the heat softenable material flows to joint the elongate substrates to each other.

8. A method according to claim 1, for joining two abutting or telescoped substrates wherein the heating of the conductive polymeric material and the urging radially inward causes the abutting ends or telescoped portions of the substrates to fuse together.

9. A method according to claim 8, wherein the article is removed from the abutted or telescoped substrates after they have fused together.

10. A method according to claim 1, wherein the article is heat-recoverable and is caused to recover by the heating of the conductive polymer element.

11. A method according to claim 1 wherein step (1) comprises wrapping a wraparound article around the substrate and positioning a closure means on the wrapped article to form it into a tubular article of closed cross-section.

12. A method according to claim 11 wherein, at least one of the electrodes is not part of the closure means.

13. A method according to claim 1 wherein the tubular article comprises two electrodes and the current flows through the conductive polymer element along two discrete current paths.

14. A wraparound assembly which comprises
(1) a wraparound article, and
(2) a closure means for closing the wraparound article to form it into a tubular article of closed cross-section, the article comprising
(i) a laminar conductive polymer element which, when the article has been formed into a tubular article of closed cross-section, extends circumferentially around at least a part of the tubular article, and
(ii) at least two electrodes which, when the article has been formed into a tubular article of closed cross-section, extend along at least a part of the axial dimension of said element and are circumferentially spaced apart from each other so that when the electrodes are connected to a source of electrical power to cause electrical current to flow through and heat the conductive polymer element between the electrodes, a substantial proportion of the current flows substantially parallel to the faces of the conductive polymer element along at least two discrete current paths which are circumferentially spaced from each other.

15. An assembly according to claim 14 wherein the wraparound article is in n parts, where n is at least three, and there are n closure means for joining the n parts together.

16. An assembly according to claim 14 wherein the wraparound article is in two parts and there are two closure means for joining the two parts together.

17. An assembly according to claim 16, wherein all parts of the wraparound article are electrically conductive.

18. An assembly according to claim 16, wherein at least a part of the conductive polymer element is heat recoverable.

19. An assembly according to claim 16, wherein only one of the article parts is electrically conductive.

20. An assembly according to claim 16, wherein only one of the article parts is heat recoverable.

21. An assembly according to claim 16, wherein at least one of the article parts is elastomeric.

22. An assembly according to claim 10, wherein the closure means comprises at least one of the electrodes.

23. An assembly according to claim 14 which further comprises a heat-softenable member which can be placed between the tubular article and the substrate.

24. An assembly according to claim 14 wherein the tubular article comprises two electrodes and the current flows through the conductive polymer element along two discrete current paths.

25. A wraparound assembly which comprises
(1) a wraparound article, and
(2) a closure means for closing the wraparound article to form it into a tubular article of closed cross-section, the article comprising
(i) a laminar conductive polymer element which, when the article has been formed into a tubular article of closed cross-section, extends circumferentially around at least a part of the tubular article, and
(ii) at least two electrodes which, when the article has been formed into a tubular article of closed cross-section, extend along at least a part of the axial dimension of said element and are circumferentially spaced apart from each other so that when the electrodes are connected to a source of electrical power to cause electrical current to flow through the heat the conductive polymer element between the electrodes a substantial proportion of the current flows substantially parallel to the faces of the conductive polymer element, at least one of the electrodes being circumferentially spaced apart from the closure means.

26. An assembly according to claim 25 which further comprises a heat-softenable member which can be placed between the tubular article and the substrate.

27. An assembly according to claim 25 wherein the tubular article comprises two electrodes and the current flows through the conductive polymer element along two discrete current paths.

* * * * *

UNITED STATES PATENT AND TRADEMARK OFFICE
CERTIFICATE OF CORRECTION

PATENT NO. : 5,137,591
DATED : August 11, 1992
INVENTOR(S) : Gansbuehler et al

It is certified that error appears in the above-indentified patent and that said Letters Patent is hereby corrected as shown below:

Column 5, line 17, replace "ot" by --to--.

Column 5, line 50, delete "by weight".

Column 5, line 52, delete "by weight".

Column 7, line 45, replace "article 2" by --article 2'--.

Column 7, line 50, replace "article 2" by --article 2'--.

Column 7, line 52, replace "article 2" by --article 2'--.

Column 7, line 61, replace "article 2" by --article 2'--.

Column 8, line 39, delete the second occurrence of "07/242,089".

Column 9, Claim 7, line 3, replace "joint" by --join--.
Column 10, Claim 22, line 1, replace "claim 10" by --claim 14--
Column 10, Claim 25, line 18, replace "the heat" by --and heat--.

Signed and Sealed this

Twenty-fifth Day of January, 1994

Attest:

BRUCE LEHMAN

*Attesting Officer*    *Commissioner of Patents and Trademarks*